ns Patent [19] [11] 3,921,591
Mayer et al. [45] Nov. 25, 1975

[54] PRESSURIZED-WATER COOLANT NUCLEAR REACTOR STEAM GENERATOR
[75] Inventors: Hans Mayer, Bubenreuth; Heinz-Jurgen Schroder, Erlangen, both of Germany
[73] Assignee: Siemens Aktiengesellschaft, Munich, Germany
[22] Filed: June 4, 1973
[21] Appl. No.: 366,313

[30] Foreign Application Priority Data
June 26, 1972 Germany............................ 2232236

[52] U.S. Cl. .................. 122/34; 165/161; 165/163
[51] Int. Cl. ............................................. F22b 1/06
[58] Field of Search ........ 122/32, 34; 165/114, 161, 165/163

[56] References Cited
UNITED STATES PATENTS
| | | | |
|---|---|---|---|
| 2,756,028 | 7/1956 | Byerly | 165/161 X |
| 2,946,570 | 7/1960 | West | 165/161 X |
| 3,483,848 | 12/1969 | Green | 122/32 |
| 3,724,532 | 4/1973 | Sprague | 122/34 |

Primary Examiner—Kennth W. Sprague
Attorney, Agent, or Firm—Kenyon & Kenyon Reilly Carr & Chapin

[57] ABSTRACT

A pressurized-water coolant nuclear reactor steam generator has a vertical housing for the steam generating water and containing an upstanding heat exchanger to which the pressurized-water coolant passes and which is radially surrounded by a guide jacket supporting a water separator on its top. By thermo - siphon action the steam generating water flows upward through and around the heat exchanger within the guide chamber to the latter's top from which it flows radially outwardly and downwardly through a down draft space formed between the outside of the jacket and the housing. The water separator discharges separated water downwardly. The housing has a feed water inlet opening adjacent to the lower portion of the heat exchanger, providing preheating of the introduced feed water. This preheated feed water is conveyed by a duct upwardly to a location where it mixes with the water discharged from the water separator.

4 Claims, 2 Drawing Figures

PRESSURIZED-WATER COOLANT NUCLEAR REACTOR STEAM GENERATOR

BACKGROUND OF THE INVENTION

A pressurized-water coolant nuclear reactor steam generator includes a vertical housing for the steam generating water and containing an inverted U-shaped nest of heat-exchanging tubes having inlet and outlet ends and radially enclosed by a vertical guide jacket which guides the steam generating water upwardly. The jacket's top supports a water separator. The housing forms a down-draft space around the jacket and has a feed water inlet adjacent to the outlet end of the nest, the separator discharging water separated from the steam, downwardly into a space. The inlet and outlet ends of the nest are in circuit with the coolant conduit of the nuclear reactor.

Preheating of the feed water effected by its introduction exchanger's outlet end, increased the thermald efficiency of the steam generator to some degree.

SUMMARY OF THE INVENTION

One object of the present invention is to effectively provide an overall improvement on the end, increased the thermal efficiency of the steam generator to some degree.

SUMMARY OF THE INVENTION

One object of the present invention is to effectively provide an overall important improvement on the thermal efficiency of such a steam generator.

According to the invention, this improvement is effected by providing means for conducting the feed water from the housing's inlet through the nest of tubes adjacent to the outlet end of the nest to preheat the feed water and then conducting this preheated feed water upwardly to the top of the guide jacket to the space where the separated water is discharged by the water separator. The water separated from the steam by the water separator has a temperature almost the same as the balance of the steam generating water in the housing. The preheated feed water, although hot, has a lower temperature and it mixes with the water discharged by the water separator, and serves to condense any steam that remains entrapped in this water, the result being to stabilize the circulation and an increase in the quantity circulation per unit of time.

The above means is in the form of a chamber formed by suitable walls around the tube nest adjacent to its outlet end and into which the feed water inlet directly discharges, a duct extending from this chamber and carrying the preheated water upwardly. This duct is arranged in the down-draft space and extends to the top of the guide jacket where it empties into a chamber forming a space beneath the water separator discharge space, and having a plurality of upwardly extending nozzles providing a widely distributed flow into this discharge space.

To avoid the need for the preheater's chamber walls to be as pressure resistant as is the generator's housing, the chamber is provided with pressure relief means so that if its internal pressure becomes excessive, an escape path is provided. This escape may be either into the lower end of the down-draft space or into the bottom of the guide jacket, and in the latter case, part way up in the jacket the latter may have a transverse plate provided with a large number of small orifices for more thoroughly distributing the feed water escaping from the preheating chamber and having a lower temperature than the balance of the water flowing upwardly within the jacket around the heat exchanging tube nest.

If it is not desired to send all of the preheating feed water up to the top of the guide jacket via the conduit previously mentioned, the top of the preheating chamber may have a number of orifices opening upwardly on the inside of the guide jacket, it being understood that the preheating chamber of necessity extends within the guide jacket so as to encompass the the outlet end of the heat exchanging tube nest.

BRIEF DESCRIPTION OF THE DRAWINGS

The accompanying drawings schematically illustrate preferred embodiments of the present invention, both being vertical sections, FIG. 1 showing a first embodiment and FIG. 2 showing a second embodiment.

DESCRIPTION OF THE PREFERRED EMBODIMENTS

Figure 1:
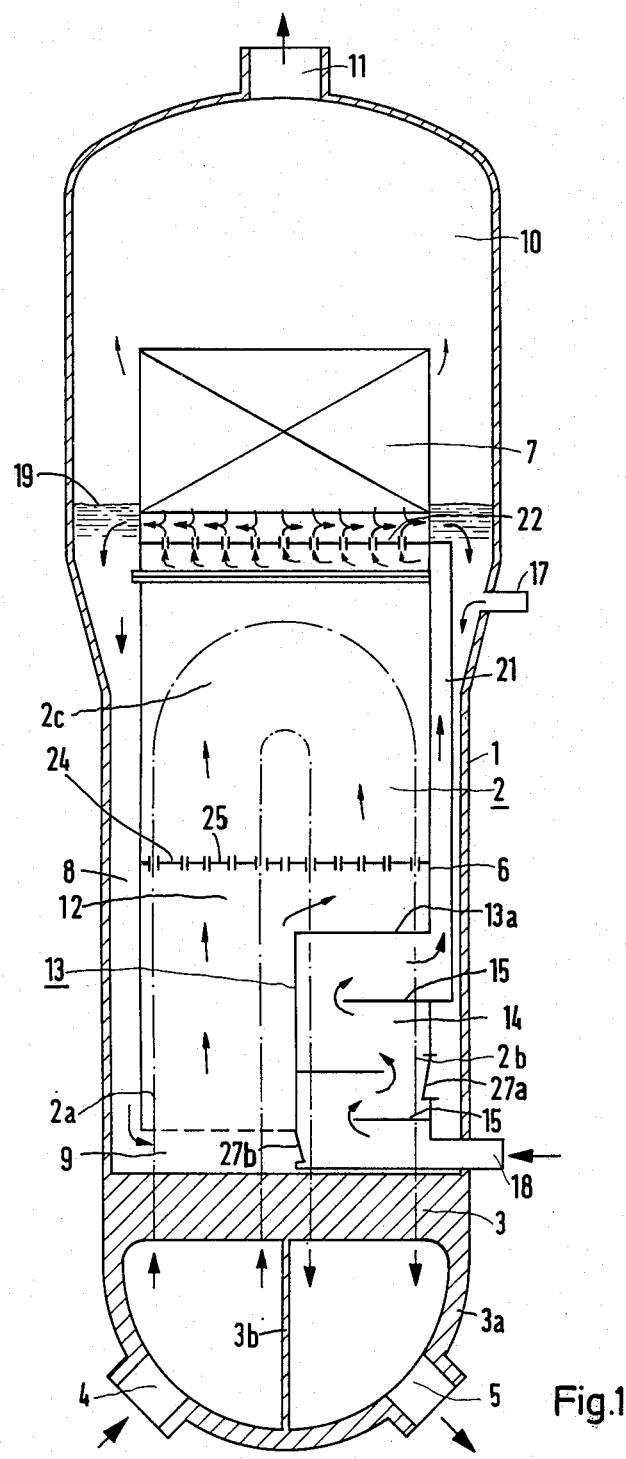

Having reference first to FIG. 1 of the above drawings, the steam generator has a generally cylindrical elongated vertical housing 1 containing the U-shaped nest 2 of heat exchanging tubes which, to avoid confusion, is shown only in outline by dash-dot-dash lines. The inlet end of the nest is via the bottom of the left-hand leg 2a and the outlet end of the nest is via the bottom of the right-hand leg 2b, these legs extending vertically for a substantial distance upwardly within the housing 1, joining by a curved portion 2c, and having their inlet and outlet ends mounted in a horizontal tube plate 3, which together with the hemispherical bottom 3a of the housing, forms two chambers separated from each other by a vertical wall 3b. The pressurized water coolant from the reactor (not shown) is introduced through the inlet 4 where it flows from the left-hand chamber into the inlet end of the left-hand nest leg 2a, the coolant going upwardly around the curve and downwardly and from the outlet end flowing into the right-hand one of the two chambers mentioned and out from the outlet 5 for return to the reactor.

Conventionally, a pressurized water reactor coolant is light water under a pressure of, for example, 150 kg/cm$^2$ with temperatures of about 300°C. The walls 3 and 3a, and the heat exchanging tube nest 2 must be capable of resisting such pressures and temperatures. The pressure differential on opposite sides of the wall 3b is not excessive.

The tube nest 2 is radially enclosed by a cylindrical tubular guide jacket 6 which extends from the bottom portion of the nest to above its top, and the top of this jacket supports a liquid separator 7. Between the outside of this jacket and the inside of the housing a so-called down-draft space 8 is defined, the bottom of this space communicating with the inside of the jacket and the water flowing upwardly within the latter for evaporation and the production of steam which passes upwardly through the water separator 7 with the steam freed from water collecting in the steam dome 10 from which it is sent to do useful work via an outlet 11.

The preheater is generally indicated schematically at 13. Walls 13a form a chamber extending inwardly from the jacket 6 and surrounding a substantial portion of the leg of the heat exchanging tube nest leg 2b which receives the coolant via the curve 2c in the inverted U-shaped nest. The bottom of the chamber defining the heat exchanger 13 is close to the top of the housing's tube plate 3 and the chamber extends upwardly for a substantial portion of the length of the leg 2b. The steam generator's feed water inlet 18 enters the bottom of this chamber and is undulatingly deflected back and forth through the medium of baffles 15 inside of the chamber so as to pass back and forth between the heat exchanging tubes. The preheater 13 connects with a duct 21 which extends upwardly within the down-draft space 8 and to the top of the guide jacket 6, where the duct connects with a chamber 22 extending across the top of the guide jacket and having a plurality of upwardly directed orifices which eject the preheated feed water into the flow of separated water leaving the water separator 7. The water mixture then flows to the down-draft space 8. This mixture, of course, mixes with the main volume of water in the water generator. It includes the separated water. The water leaving the separator is boiling water containing residual steam, the flow being sometimes called the carry-under, and although the preheated feed water is hot, it is cooler than the boiling water leaving the water separator, therefore functioning to condense the steam which it may include.

The preheater 13 is shown as having valved outlets 27a and 27b. These may be of the pressure responsive type and should function to discharge water from the preheater chamber in the event the pressure differential between this water and the main volume of water in the generator becomes so great as to possibly cause the walls 13a to fail. Ordinarily this pressure differential is not excessive under normal operation conditions so the preheater walls may be of relatively light construction as compared to that of the housing 1. If the outlet 27b opens, its location is such that it discharges upwardly within the guide jacket 6. To produce a better thermal distribution, the jacket is provided with a transverse wall 24 about ⅔ up the height of the tube nest 2. This wall or partition has a large number of openings 25 and it serves to distribute the upward flow of water which is producing the steam by its evaporation.

The normal water level 19 within the housing 1 is above the area in which the water separator and the duct 21 discharge. Maintenance of this water level may be effected by an inlet 17, but the amount of this water is very small, being approximately, for example, 1/10 of the volume introduced through the feed water inlet 18 for evaporation.

Figure 2:
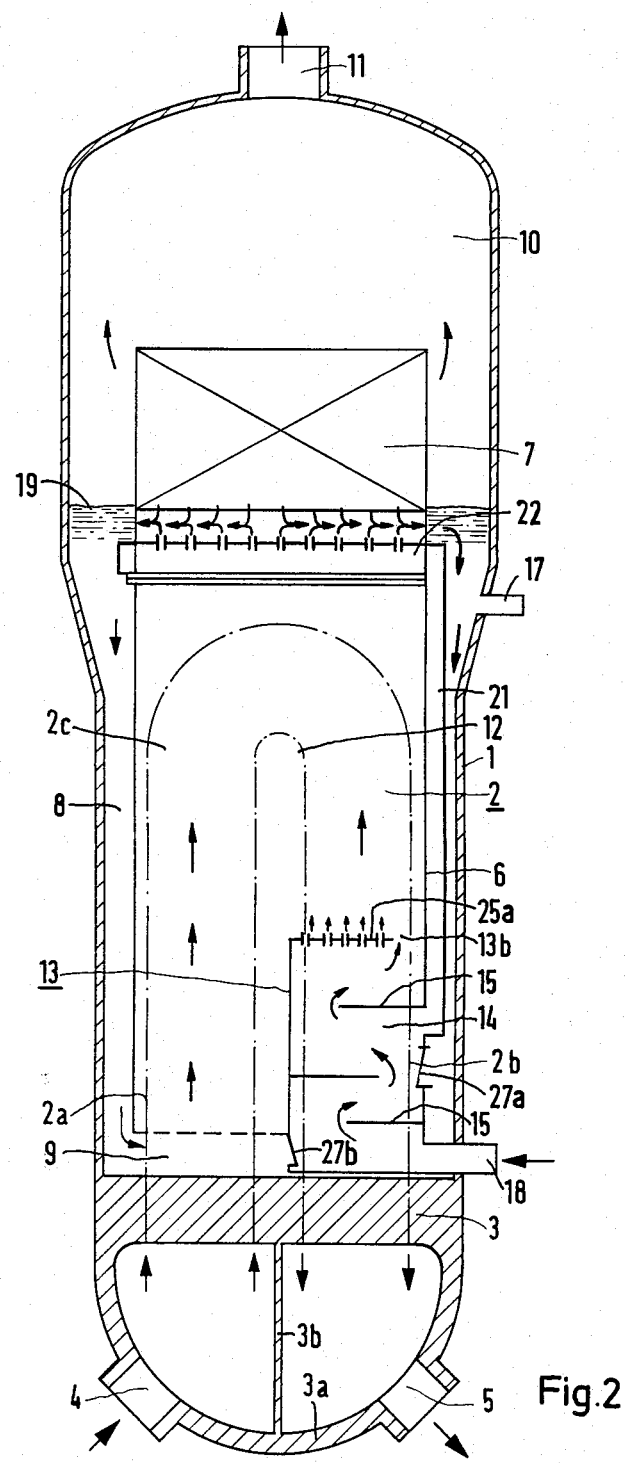

In the embodiment shown by FIG. 2 the top of the preheater 13 is a wall 25a having a multiplicity of perforations functioning somewhat like the wall or partition 25 in the first embodiment. In addition, an opening 13b is formed in the top of the water separator. It follows that with this construction only a portion of the feed water 18 that passes through the preheater 13 goes upwardly through the duct 21.

The flow volume upwardly through the duct 21 may be adjusted so that it is only sufficient to condense the steam in the water discharged from the water separator 7. The volume escaping through the opening 13b and the orifices 25a in the preheater's top wall may have from one to four times that of the preheated feed water flowing upwardly through the duct 21.

The water fed through the inlet 17 to maintain the level 19 is, as previously indicated, only about 1/10 of the amount fed through the inlet 18 for evaporation into steam. Therefore, this water, because of its volume and possibly its location of introduction, cannot act effectively to condense steam mixed with the water discharged from the water separator.

What is claimed is:

1. A steam generator including a vertical housing having lower and upper portions and having a feed-water inlet in said lower portion and a steam outlet in said upper portion and containing an inverted U-shaped nest of heat exchanger tubes forming inlet and outlet leg ends, a vertical guide jacket radially enclosing said nest and radially spaced inwardly from said housing, a feed-water preheater chamber radially enclosing said outlet leg end and connected with said feed-water inlet, and a water separator positioned above said jacket below said steam outlet and downwardly discharging separated water; wherein the improvement comprises a duct connected with said preheater to receive preheated feed-water therefrom and extending to adjacently below said water separator at a location feeding the preheated feed water directly into separated water discharged by said water separator.

2. The steam generator of claim 1 in which said preheater chamber is formed at least in part by walls of light construction as compared to that of said housing, said chamber having at least one outlet valve of the pressure-responsive type which opens in response to the pressure differential between said chamber and said housing.

3. The steam generator of claim 1 having means for introducing additional feed water to said housing's said upper portion.

4. The steam generator of claim 1 in which said preheater chamber has an opening into said guide jacket and a flow-distributing plate having interspaced openings extending across the inside of said jacket above said opening.

* * * * *

UNITED STATES PATENT AND TRADEMARK OFFICE
CERTIFICATE OF CORRECTION

PATENT NO. : 3 921 591
DATED : November 25, 1975
INVENTOR(S) : Hans Mayer and Heinz-Jürgen Schröder It is certified that error appears in the above-identified patent and that said Letters Patent are hereby corrected as shown below:

Foreign Application No. should be "2231236," not "2232236."

Column 1, line 19, delete "thermald" and substitute "thermal."

Column 1, line 19, after the word "introduction" insert "adjacent to the heat."

Column 1, lines 21 through 26: delete.

Column 1, line 30, delete the word "important."

Signed and Sealed this twenty-seventh Day of April 1976

[SEAL]

Attest:

RUTH C. MASON
Attesting Officer

C. MARSHALL DANN
Commissioner of Patents and Trademarks